United States Patent
Doblar et al.

(10) Patent No.: US 8,595,534 B2
(45) Date of Patent: Nov. 26, 2013

(54) METHOD FOR SYSTEM ENERGY USE MANAGEMENT OF CURRENT SHARED POWER SUPPLIES

(75) Inventors: Drew G. Doblar, San Jose, CA (US); Michael Bushue, Santa Clara, CA (US)

(73) Assignee: Oracle International Corporation, Redwood Shores, CA (US)

(*) Notice: Subject to any disclaimer, the term of this patent is extended or adjusted under 35 U.S.C. 154(b) by 466 days.

(21) Appl. No.: 12/886,843

(22) Filed: Sep. 21, 2010

(65) Prior Publication Data

US 2012/0072754 A1    Mar. 22, 2012

(51) Int. Cl.
*G06F 1/26*    (2006.01)

(52) U.S. Cl.
USPC .......................................................... 713/340

(58) Field of Classification Search
USPC .......................................................... 713/340
See application file for complete search history.

(56) References Cited

U.S. PATENT DOCUMENTS

| | | | |
|---|---|---|---|
| 7,337,333 B2 * | 2/2008 | O'Conner et al. | 713/300 |
| 7,876,587 B2 * | 1/2011 | Balakrishnan et al. | 363/95 |
| 7,904,115 B2 * | 3/2011 | Hageman et al. | 455/561 |
| 8,198,878 B2 * | 6/2012 | Bandholz et al. | 323/282 |
| 2005/0116546 A1 * | 6/2005 | Zeighami et al. | 307/51 |

* cited by examiner

*Primary Examiner* — Kim Huynh
*Assistant Examiner* — Eric Chang
(74) *Attorney, Agent, or Firm* — Osha Liang LLP (57) ABSTRACT

A non-transitory computer readable storage medium having computer readable program code embodied therein, where the computer readable program code is adapted to, when executed by a processor, implement a method for managing a power supply system. The method includes identifying a number of power supplies included in the power supply system, and determining a first system mode for the power supply system. The method also includes determining a first operating order for the power supplies, and assigning a first ACTIVE ON threshold to each of the power supplies to obtain a number of first ACTIVE ON thresholds. The method further includes assigning a first ACTIVE STANDBY OFF threshold to each of the power supplies to obtain a number of first ACTIVE STANDBY OFF thresholds, where the power supply system provides electrical power to at least one computer system.

20 Claims, 7 Drawing Sheets

METHOD FOR SYSTEM ENERGY USE MANAGEMENT OF CURRENT SHARED POWER SUPPLIES

BACKGROUND

Some computer systems require a reliable supply of electrical power. For example, a server used to process sales and accounting transactions may be considered to be a critical to a corporation, and may thus require a continuous supply of electrical power. In such computer systems, electrical power may be provided by multiple power supply units (PSUs). In particular, one (or more) of the PSUs may be held in reserve, to be brought on line in the case of a failure of an active PSU.

Weighing against the performance required of a power supply system is a need to reduce energy consumption. PSUs in a power supply system, if not managed properly, may consume high amounts of energy. Government standards have been enacted to encourage a reduction in the use of power supply systems, both in an effort to conserve resources and to help reduce the energy costs of companies using power supply systems. Further, companies that design power supply systems and their components, including control systems, may be motivated to exceed the government standards that have been created.

SUMMARY

In general, in one aspect, the invention relates to a non-transitory computer readable storage medium having computer readable program code embodied therein, the computer readable program code adapted to, when executed by a processor, implement a method for managing a power supply system. The method includes identifying a number of power supplies included in the power supply system, and determining a first system mode for the power supply system. The method also includes determining a first operating order for the power supplies, and assigning a first ACTIVE ON threshold to each of the power supplies to obtain a number of first ACTIVE ON thresholds. The method further includes assigning a first ACTIVE STANDBY OFF threshold to each of the power supplies to obtain a number of first ACTIVE STANDBY OFF thresholds, where the power supply system provides electrical power to at least one computer system.

In general, in one aspect, the invention relates to a power supply system. The system includes a number of power supplies and a system controller. The system controller is configured to determine a system mode for the power supply system, and determine an operating order for the power supplies. The system controller is further configured to assign the system mode to each of the power supplies, and assign an ACTIVE ON threshold to each of the power supplies to obtain a number of ACTIVE ON thresholds. The system controller is further configured to assign an ACTIVE STANDBY OFF threshold to each of the power supplies to obtain a number of ACTIVE STANDBY OFF thresholds, where the power supply system provides electrical power to a computer system, where each of the ACTIVE ON thresholds is distinct, and where each of the ACTIVE STANDBY OFF thresholds is distinct.

In general, in one aspect, the invention relates to a system controller for a power supply system. The system includes a processor and a computer readable medium including computer readable program code embodied therein, which when executed by the processor, perform a method. The method includes identifying a number of power supplies included in the power supply system, and determining a first system mode for the power supply system. The method also includes determining a first operating order for the power supplies, and assigning a first ACTIVE ON threshold to each of the power supplies to obtain a number of first ACTIVE ON thresholds. The method further includes assigning a first ACTIVE STANDBY OFF threshold to each of the power supplies to obtain a number of first ACTIVE STANDBY OFF thresholds.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a system and method for managing a power supply system in an energy efficient manner. In one or more embodiments, a system controller may configure settings of intelligent power supplies to activate/deactivate at specific system load levels. These settings may include an ACTIVE ON threshold, ACTIVE STANDBY OFF threshold, and an operating mode. The system controller may also monitor the power supply system to determine whether to reconfigure the settings of one or more power supplies. Once programmed, the power supplies may operate autonomously.

Figure 1A:
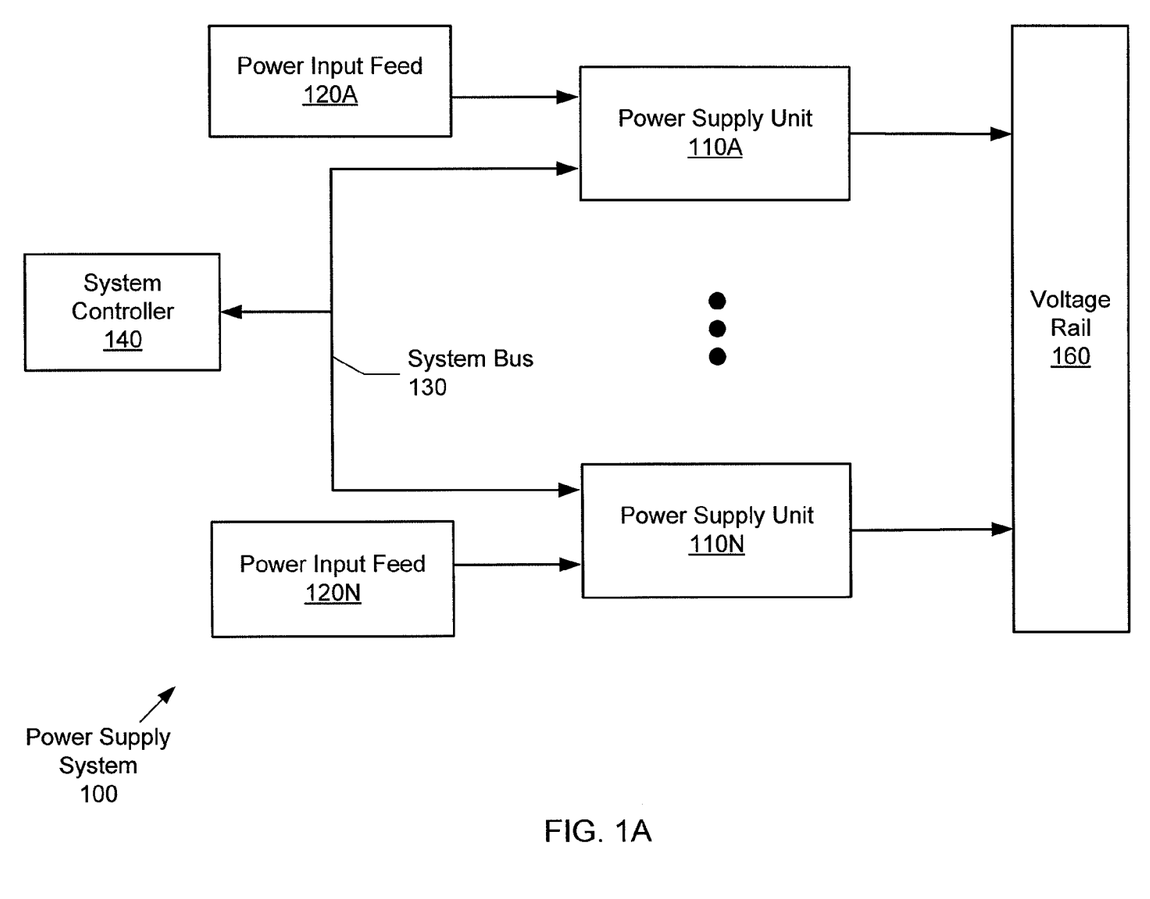
FIGS. 1A-1B show a power supply system, in accordance with one or more embodiments of the invention.

FIG. 1A shows a power supply system (100) in accordance with one or more embodiments of the invention. In one or more embodiments, the power supply system (100) provides electrical power to a single computing device (e.g., a server, mainframe, desktop PC, laptop, PDA, etc.) or to a collection of computing devices (e.g., a blade server, a server rack, a computing cluster, etc.).

In one or more embodiments, the power supply system (100) may include multiple power supply units (PSUs) (e.g., PSUs (110A), (110N)), multiple power input feeds (PIFs) (e.g., PIFs (120A), (120N)), a system bus (130), a system controller (140), and a voltage rail (160). In one or more embodiments, a PSU may receive electricity from the PIFs in a first form, and may convert the electricity to a second form suitable for the computing device(s). For example, in one or more embodiments, a PSU may convert alternating current (AC) to direct current (DC). Alternatively, in other embodiments, a PSU may convert DC to AC, DC at a first voltage to DC at a second voltage, AC at a first voltage to AC at a second voltage, and the like. In one or more embodiments, the electrical output of each PSU may be conducted to a voltage rail (160). The computing device(s) (not shown) may draw power by connecting to the voltage rail (160).

In one or more embodiments, the system controller (140) may be configured to manage, to some degree, the operation of each PSU in a power supply system (100). The system controller (140) may communicate by sending and/or receiving one or more controlled signals. The system controller (140) may be powered by a dedicated PIF, by a PIF shared by a PSU, or some other device in the power supply system (100). The system controller (140) may also be connected to an uninterruptible power supply (not shown) for continuous operation.

Figure 1B:
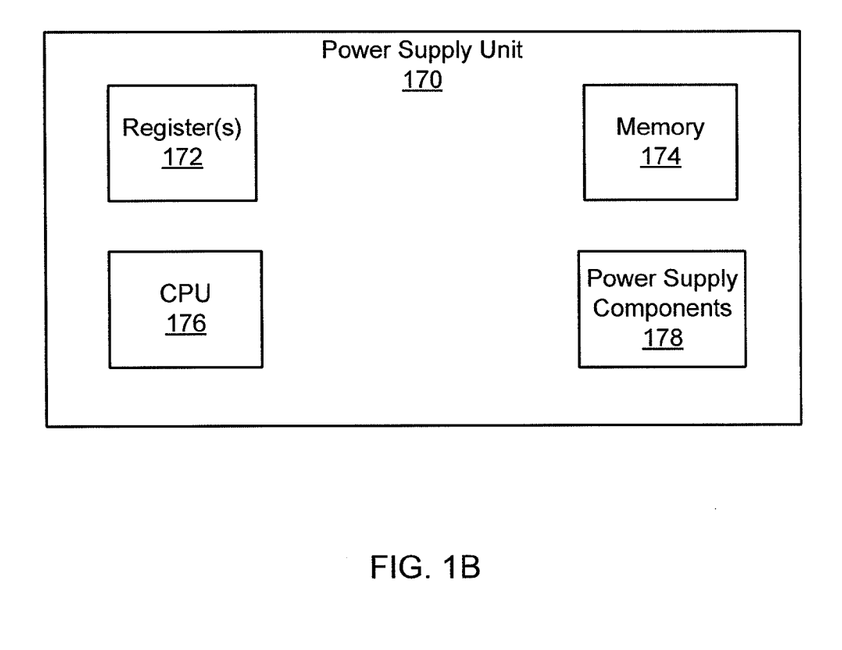

FIG. 1B shows components included in a PSU (170), in accordance with one or more embodiments of the invention. As shown in FIG. 1B, PSU (170) may include register(s) (172), memory (174), central processing unit (CPU) (176), and power supply components (178). In one or more embodiments, register(s) (172) may be electronic memory locations configured to store configuration settings for the PSU (170). The configuration settings may be part of a control system and received from the system controller (140), a number of PSUs in a power supply system, or any other suitable source. The memory (174) may include any computer memory device (e.g., random access memory (RAM), cache memory, flash memory, etc.). The CPU (176) may be any integrated circuit, processor, single-core processing chip, multi-core processing chip, or multi-chip module (including multiple multi-core processing chips). Further, the memory (174) (or portions thereof) may also be part of the CPU (176). The power supply components (178) may include any components used for converting AC to DC, for converting from one voltage to another voltage, and the like (e.g., transformers, rectifiers, diode, resistors, capacitors, etc.). Optionally, the PSU (170) may also include a charging module (not shown) configured to manage the charging of the power supply components (178). Further, the PSU (170) may optionally include a non-volatile storage medium (not shown) for storing software instructions to perform embodiments of the invention.

Referring again to FIG. 1A, in one or more embodiments, each PSU may be provided with electricity by a separate PIF. For example, as shown in FIG. 1A, PSU (110A) receives electricity from PIF (120A), and PSU (110N) receives electricity from PIF (120N). Alternatively, in one or more embodiments, a single PIF may provide electricity to multiple (or all) PSUs included in the power supply system.

In one or more embodiments, each PSU may be operated in various operating modes. For example, a PSU operating in an ON mode is actively supplying electricity to the voltage rail (160). In another example, a PSU operating in an STANDBY mode is not actively supplying electricity to the voltage rail (160), but is configured to rapidly switch to the ON mode in response to a failure in the power supply system (100) (e.g., in the event that an active PSU fails). In yet another example, a PSU operating in an OFF mode is not supplying electricity to the voltage rail (160), and is not configured to rapidly switch to the ON mode in response to a failure elsewhere in the power supply.

In one or more embodiments, the power supply system (100) may be configured to be a redundant system, meaning that one or more PSUs are maintained in reserve to be used in the case of PSU failure. For example, assume that the PSUs of the power supply system (100) are divided into pairs, with the first PSU in a pair designated as primary, and the second PSU in a pair designated as back-up. In this situation, the primary PSU is maintained in an ON mode, and the back-up PSU is maintained in a STANDBY mode. Accordingly, in the event of a failure of the primary PSU, the back-up PSU will switch to ON mode, thereby ensuring uninterrupted power supply to the voltage rail (160).

In one or more embodiments, the system bus (130) may transmit data between the various PSUs, as well as between the system controller (140) and each PSU. Optionally, the system bus (130) may include any number of parallel and/or serial control buses or channels. The system bus (130) may be implemented on any medium for data communication (e.g., wire cable, fiber-optic cable, wireless connection, etc.). Further, the system bus (130) (or portions thereof) may be implemented using any network/communication protocol (e.g., Inter-Integrated Circuit Bus, SMBus, PMBus, Ethernet, Token Ring, WiFi, Bluetooth, ZigBee, etc.).

In one or more embodiments, each PSU may use the system bus (130) to transmit a bidirectional control signal indicating an output load of the power supply system (100). In one or more embodiments, each PSU in the power supply system (100) may contribute to the bidirectional control signal proportionately to their operating output current. Such a bidirectional control signal is referred to herein as a "current share signal." The current share signal may, for example, indicate the output power of each PSU in the power supply system as a percentage of the maximum output power or the actual output power for each PSU. Alternatively, the current share signal may indicate other measures of the output power of each PSU (e.g., an absolute power level, a relative power level, and the like). In one or more embodiments, the current share signal may be an analog signal (e.g., a voltage level, a current level, etc.), a digital signal (e.g., digital bits), and the like. In one or more embodiments, the current share signal may be transmitted continuously or periodically (i.e., at regular intervals or on a random basis). In one or more embodiments of the invention, the current share signal is an aggregation of all signals emitted by each PSU in the power supply system (100).

In one or more embodiments of the invention, a current share signal may be an average (e.g., mean, median) of the output (or percentage of the output) of all enabled PSUs (i.e., PSUs operating in the IStar mode of ACTIVE ON) in the power supply system (100). The output may be the actual output power of the PSU, the maximum output power of the PSU, or some other measure of output of the PSU. In such a case, it is possible that the current share signal may decrease slightly after a PSU in the power supply system changes its mode from ACTIVE STANDBY OFF to ACTIVE ON (described below). The current share signal may also be a summation of the output (or percentage of the output) of all PSUs in the power supply system (100). Those skilled in the art will appreciate that the current share signal may be configured in various other ways to communicate with the PSUs in the power supply system (100).

In one or more embodiments, the system controller (140) may manage an operating mode of the power supply system (100) (referred to hereinafter as a "system mode"). For example, the system controller (140) may use the system bus (130) to configure the power supply system (100) to operate in a normal system mode. Specifically, when operating under the normal system mode, each PSU is operating in either an ON mode or an ACTIVE STANDBY ON mode. In one or more embodiments, the ACTIVE STANDBY ON mode shares the characteristics of the STANDBY mode described above, meaning the PSU is not actively supplying electricity to the voltage rail (160), and is configured to rapidly switch to the ON mode in response to a failure. However, the ACTIVE STANDBY ON mode further requires that the switching regulator of the PSU is enabled, such that that the output bulk capacitors of the PSU are charged to the voltage rail (160). Optionally, the normal system mode may be a Light Load Efficiency Mode (LLEM) system mode.

In one or more embodiments, the switching regulator of the PSU may include a number of different electrical components used in a number of different combinations, and may be configured to send discrete segments of power to the voltage rail (160). For example, a switching regulator may include one or more inductors, one or more diodes, an electrical switch (e.g., a field-effect transistor (FET)), a controller (e.g., a pulse width modulation (PWM) controller), and one or more capacitors. A switching regulator may also include other electrical components, including but not limited to one or more resistors and one or more integrated circuits with logic gates and timers. In one or more embodiments, a switching regulator may also act as a rectifier, converter, step-up transformer, or step-down transformer.

In one or more embodiments, the system controller (140) may use the system bus (130) to selectively configure the power supply system (100) to operate in the IStar system mode. As used herein, "IStar" refers to an energy-efficient system mode in which each PSU is initially programmed by the system controller (140) with a mode and thresholds. In one or more embodiments, once programmed with a mode and thresholds, a PSU may control its own operation autonomously (i.e., without intervention from a central control source such as the system controller (140)). In one or more embodiments, the mode and thresholds may be unique to each PSU in the power supply system (100).

In one or more embodiments, when operating under the IStar system mode, the system controller (140) and/or a PSU may send a control signal (or signals) over the system bus (130) to set each PSU to either an ACTIVE ON mode or an ACTIVE STANDBY OFF mode. In one or more embodiments, the ACTIVE STANDBY OFF mode shares the characteristics of the STANDBY mode described above, meaning the PSU is not actively supplying electricity to the voltage rail (160), and is configured to rapidly switch to the ON mode in response to a failure. However, the ACTIVE STANDBY OFF mode further requires that the output bulk capacitors of the PSU are charged while the switching regulator of the PSU is not enabled. In one or more embodiments, the ACTIVE ON mode shares the characteristics of the ON mode described above, meaning the PSU is actively supplying electricity to the voltage rail.

In one or more embodiments, the mode and thresholds may dictate an order under which each PSU in the power supply system (100) is instructed to activate (i.e., change IStar mode to ACTIVE ON). Specifically, the order of PSU activations may be implied by the ACTIVE ON threshold assigned to each PSU. For example, a PSU that is designed to change its mode to ACTIVE ON first among the current share PSUs in the power supply system (100) may receive a threshold of 0.1V for ACTIVE ON. Further, a PSU that is designed to change its mode to ACTIVE ON second among the current share PSUs in the power supply system may receive a threshold of 0.2V for ACTIVE ON.

In one or more embodiments of the invention, the threshold for the IStar mode of ACTIVE STANDBY OFF includes a default value, a range of potential threshold values, and an initial threshold value. While the threshold values herein are described as voltages, the threshold values may be other types of values, including but not limited to current (measured in Amperes). The default value may represent a maximum value allowed for the IStar mode of ACTIVE STANDBY OFF.

Further, in one or more embodiments of the invention, the threshold for the IStar mode of ACTIVE ON includes a default value, a range of potential threshold values, and an initial threshold value. While the threshold values for the IStar mode of ACTIVE ON may be of the same type (e.g., voltage in volts, current in amperes) as the threshold values for the IStar mode of ACTIVE STANDBY OFF. The default value may represent a minimum value allowed for the IStar mode of ACTIVE ON.

In one or more embodiments of the invention, for a particular control signal sent to a PSU by the system controller (140), any and all threshold values associated with the IStar mode of ACTIVE STANDBY OFF are less than any and all threshold values associated with the IStar mode of ACTIVE ON. In other words, there may be a gap between the highest possible threshold value for the IStar mode of ACTIVE STANDBY OFF and the lowest possible threshold value for the IStar mode of ACTIVE ON. In one or more embodiments of the invention, the rationale for having the gap between the highest possible threshold value for the IStar mode of ACTIVE STANDBY OFF and the lowest possible threshold value for the IStar mode of ACTIVE STANDBY ON is because the current share signal delivered to each PSU has an error tolerance that may range from +/−5% to +/−15%. Further, a power supply operating at low load (e.g., 20% of its maximum load) may have an error tolerance that ranges from +/−1% to +/−3%. As a result, to avoid enabling an incorrect IStar mode based on a current share signal received by a PSU, the threshold value for the IStar mode of ACTIVE STANDBY OFF may be set at least 4% (in terms of the total output capability for a PSU) lower than the threshold value for the IStar mode of ACTIVE ON.

In one or more embodiments of the invention, a separate activation signal is needed to activate an IStar mode in each PSU. The activation signal may be sent by the system controller (140), by one or more of the PSUs in the power supply system (100), or any other suitable device. The activation signal may also be part of the current share signal.

In one or more embodiments, each PSU may include an IStar setting, meaning a flag indicating whether the PSU is operating under the IStar system mode. The IStar setting may be stored in the register(s) (172) (shown in FIG. 1B).

In one or more embodiments, the level of each current share signal received by a PSU may be checked against its thresholds to determine whether the PSU should operate under a different mode than its current mode. Specifically, in one or more embodiments, when operating under the IStar system mode (e.g., the IStar setting indicates that IStar system mode is selected), each PSU compares the current share signal to at least an ACTIVE ON threshold and/or an ACTIVE STANDBY OFF threshold. Further, upon determining that the ACTIVE ON threshold or the ACTIVE STANDBY OFF threshold has been passed, the PSU may switch to a different mode. For example, assume that a first PSU is in the ACTIVE STANDBY OFF mode. Assume further that the first PSU determines that the current share signal has exceeded the ACTIVE ON threshold. In this situation, the first PSU may switch to the ACTIVE ON mode. In another example, assume that a second PSU is in the ACTIVE ON mode. Assume further that the second PSU determines that the current share signal has dropped below the ACTIVE STANDBY OFF threshold. In this situation, the second PSU may switch to the ACTIVE STANDBY OFF mode.

In one or more embodiments, the system controller (140) may use the system bus (130) to monitor the state of the power supply system (100). In particular, in one or more embodiments, the system controller (140) may monitor the system bus (130) for an indication of a requirement to reconfigure the power supply system (100). Further, upon detecting such an indication, the system controller (140) may reconfigure the power supply system (100). Specifically, in one or more embodiments, the system controller (140) may use the system bus (130) to modify modes and/or thresholds of the PSUs of the power supply system (100). The monitoring and reconfiguration of the power supply system (100) are described in greater detail below with reference to FIG. 3.

In one or more embodiments of the invention, a goal of a PSU operating under IStar is to set the threshold value for the IStar mode of ACTIVE STANDBY OFF as high as possible. The rationale for such a goal may be to utilize the significant energy efficiency and associated energy savings that the IStar mode of ACTIVE STANDBY OFF generates compared to other standby modes outside of IStar. After receiving the activation signal, a PSU under IStar control may be configured to make adjustments to a threshold for any IStar mode without further instruction from or intervention by the controller. In one or more embodiments of the invention, the system controller (140) may be configured to send an activation signal to the PSUs to activate IStar in each PSU after a fault that disabled IStar in the power supply system (100) has been cleared.

Referring again to FIG. 1B, the following list includes examples of registers (172) which may be included in the PSU (170), according to one or more embodiments:

ISSEL—IStar indicator, indicates that the PSU is configured to participate in IStar system mode.
ISHARE—indicates the level of the current share signal, common to all power supplies.
ISON—indicates the level of the ACTIVE ON threshold.
ISOFF—indicates the level of the ACTIVE STANDBY OFF threshold.
ISDRIP—IStar drip indicator, indicates that the ACTIVE STANDBY OFF threshold is to be incremented.
ISFAULT—IStar fault indicator, indicates a fault in a power supply.
ISREENABLED—Indicates that IStar system mode may be reentered.
ISOFFONLOTS—Indicates excessive transitions from ACTIVE STANDBY OFF to ACTIVE ON states within a time window. This signal is latched within the PSU until cleared by the system.
EXCESSIVE_ISFAULT—Indicates excessive ISFAULT events. This signal is latched within the PSU until cleared by the system.
IS_STATE_FORCE—Indicates that the IStar state is forced by system controller.
IS_STATE—Indicates IStar system mode.
IS_ASOFF_COUNT_LIMIT—Indicates the IStar ACTIVE STANDBY OFF count limit (number of entries into ACTIVE STANDBY OFF that triggers a required reduction of ISOFF.
IS_ASOFF_COUNT_INTERVAL—Indicates the interval over which entries into
IStar ACTIVE STANDBY OFF are counted.
IS_STEPUP_SIZE—Indicates IStar threshold step up size.
IS_STEPDOWN_SIZE—Indicates the IStar threshold step down size.
IS_DRIP_INTERVAL—Indicates the IStar interval of time after which the ACTIVE STANDBY OFF threshold is incremented by the IS_STEPUP SIZE.
IS_FAULT FORCE—Indicates an IStar fault force.
IS_FAULT ENABLE—Indicates an IStar fault enable.
IS_FAULT ON TIME—Indicates the minimum time for which the PSU remains ON after ISFAULT becomes active. After this time, the PSU enters ON state with IStar disabled.
IS_PSU_NAME—Indicates an ID for the PSU.
IS_FAULT_COUNT_LIMIT—Indicates an IStar fault count limit.
IS_FAULT_COUNT_INTERVAL—Indicates an IStar fault count limit interval.

The following list includes examples of signals which may be transmitted using the system bus (130), according to one or more embodiments:

ISSEL—IStar mode is selected.
ISHARE—Current share signal.
ISON—ACTIVE ON threshold.
ISOFF—ACTIVE STANDBY OFF threshold.
ISDRIP—IStar drip indicator. When true, this signal indicates that the IStar OFF threshold increment period has elapsed.
ISFAULT—IStar fault indicator.
IS_REENABLED—Indicates IStar system mode is reenabled.
ISOFFONLOTS—Indicates excessive transitions from IStar ACTIVE STANDBY OFF to ACTIVE ON mode within the IS_ASONOFF_COUNT_INTERVAL time window.
EXCESSIVE_ISFAULT—Indicates excessive ISFAULT events within the IS_FAULT_COUNT_INTERVAL time window.

Note that the power supply system (100) is provided for illustrative purposes only, and is not intended to limit embodiments of the invention. In particular, a person of skill in the art will appreciate that the power supply system (100) may be configured in a different manner that that shown in FIG. 1A.

Figure 2:
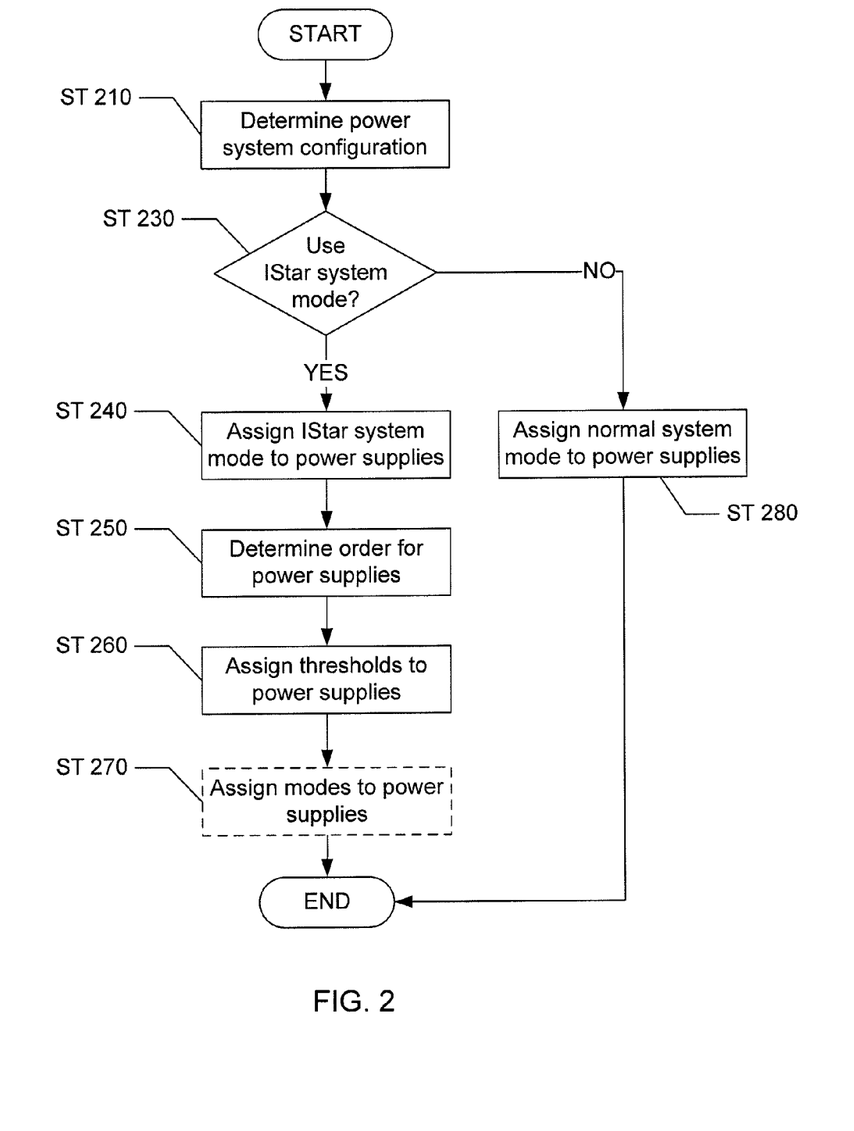
FIG. 2 shows a flow chart, in accordance with one or more embodiments of the invention.

FIG. 2 shows a flowchart of a method for managing a power supply system, in accordance with one or more embodiments of the invention. In particular, FIG. 2 illustrates a method for performing an initial configuration of a power supply system. Further, the process shown in FIG. 2 may correspond to the power supply system (100) and/or PSU (170) described above with reference to FIGS. 1A-1B. Those skilled in the art, having the benefit of this detailed description, will appreciate that the sequence of steps shown in FIG. 2 may differ among embodiments of the invention, and that one or more of the steps shown in FIG. 2 may be omitted, repeated, performed in parallel, and/or performed in a different order. Accordingly, the specific arrangement of steps shown in FIG. 2 should not be construed as limiting the scope of the invention.

At ST 210, the configuration of a power supply system may be determined. For example, referring to FIG. 1A, the system controller (140) may determine that the power supply system (100) includes two PSUs (e.g., PSU (110A) and PSU (110N) shown in FIG. 1A). Further, the system controller (140) may determine that the power supply system (100) includes two PIFs (e.g., PIF (120A) and PIF (120N) shown in FIG. 1A). In one or more embodiments, the system controller (140) may use the system bus (130) to determine the configuration of power supply system (100).

At ST 230, a determination is made about whether the power supply system should use the IStar system mode. For example, referring to FIG. 1A, the system controller (140) may determine whether the power supply system (100) should operate under the IStar system mode. In one or more embodiments, the system controller (140) may base this determination on the configuration of the power supply system (100). Optionally, the system controller (140) may also base this determination on other factors, such as user commands, configuration parameters, time-dependent policies, energy conservation policies, energy price parameters, demand for computing services, and the like.

If it is determined at ST 230 that the power supply system should not use the IStar system mode, then at ST 280, the PSUs are assigned to the normal system mode. In one or more embodiments, assigning a PSU to normal system mode includes putting the PSU in ON mode, disabling IStar mode in the PSU, and sharing current by way of the current share signal. For example, the system controller (140) may use the system bus (130) to set the IStar setting of each PSU to "not enabled," thereby indicating that the PSU is not in an IStar mode. After ST 280, the process terminates.

However, if it is determined at ST 230 that the power supply system should use the IStar system mode, then at ST 240, the PSUs are assigned to the IStar system mode. For example, the system controller (140) may use the system bus (130) to set the IStar setting of each PSU to "enabled," thereby indicating that the PSU is in the IStar mode. In one or more embodiments, each PSU may store the IStar setting in an internal register (e.g., register(s) 172) shown in FIG. 1B. In one or more embodiments, the configuration of a power supply system At ST 250, an order may be determined for the PSUs. For example, the system controller (140) may determine that a first PSU (e.g., PSU (110A)) should provide power to a computing device(s) (not shown) before a second PSU (e.g., PSU (110N)). Accordingly, the system controller (140) may determine a PSU order whereby the first PSU will become active at a lower load level than the second PSU.

At ST 260, each PSU may be assigned one or more thresholds according to the PSU order (determined at ST 250). In one or more embodiments, the one or more thresholds may include an ACTIVE ON threshold and an ACTIVE STANDBY OFF threshold. For example, referring to FIG. 1A, the system controller (140) may use the system bus (130) to set an ON threshold and an ACTIVE STANDBY OFF threshold for the PSU (110A). In one or more embodiments, each PSU may then store the ACTIVE ON threshold and the ACTIVE STANDBY OFF threshold in internal registers (e.g., register(s) 172) shown in FIG. 1B. In one or more embodiments, the ACTIVE ON thresholds and ACTIVE STANDBY OFF thresholds of various PSUs may be distinct (i.e., different from one PSU to another). Further, the ACTIVE ON thresholds and ACTIVE STANDBY OFF thresholds of various PSUs may be set such that particular a particular PSU becomes active at a lower load level that another PSU. In this manner, the PSUs may be programmed according to the PSU order.

At ST 270, each PSU may optionally be assigned a mode. For example, referring to FIG. 1A, the system controller (140) may use the system bus (130) to set PSU (110A) to an ACTIVE ON mode, and to set PSU (110N) to an ACTIVE STANDBY OFF mode. In one or more embodiments, the PSUs may then store their respective modes in internal registers (e.g., register(s) 172) shown in FIG. 1B. Alternatively, in one or more embodiments, the system controller (140) may not assign initial modes to the PSUs. Rather, the PSUs may enter various modes according to the current share signal and the thresholds assigned at ST 260 (i.e., the ACTIVE ON threshold and an ACTIVE STANDBY OFF threshold). After ST 270, the process terminates.

Figure 3:
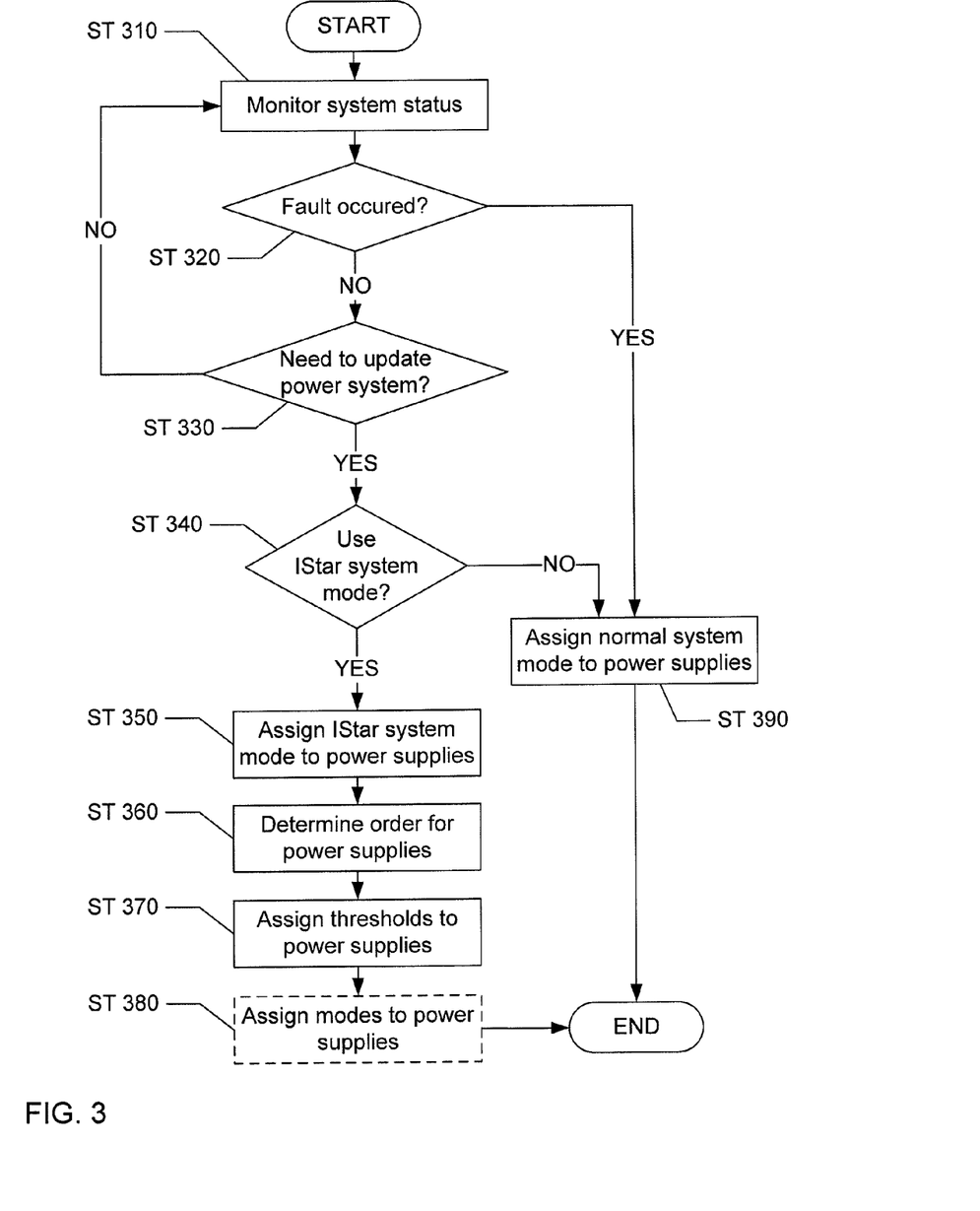
FIG. 3 shows a flow chart, in accordance with one or more embodiments of the invention.

FIG. 3 shows a flowchart of a method for managing a power supply system, in accordance with one or more embodiments of the invention. In particular, FIG. 3 illustrates a method for monitoring and reconfiguring a previously configured power supply system (i.e., a power supply system initially configured using the method shown in FIG. 2). Further, the process shown in FIG. 3 may correspond to the power supply system (100) and/or PSU (170) described above with reference to FIGS. 1A-1B. Those skilled in the art, having the benefit of this detailed description, will appreciate that the sequence of steps shown in FIG. 3 may differ among embodiments of the invention, and that one or more of the steps shown in FIG. 3 may be omitted, repeated, performed in parallel, and/or performed in a different order. Accordingly, the specific arrangement of steps shown in FIG. 3 should not be construed as limiting the scope of the invention.

At ST 310, the status of the power supply system may be monitored. For example, referring to FIG. 1A, the system controller (140) may use the system bus (130) to monitor for fault signals (i.e., signals indicating a fault event in the power supply system (100)). Further, the system controller (140) may also use the system bus (130) to monitor the status of each PSU included in the power supply system (100). In one or more embodiments, the monitoring of the PSUs may be performed by using the system bus (130) to polling each PSU for its status.

At ST 320, a determination is made about whether a fault has occurred in the power supply system. For example, referring to FIG. 1A, the system controller (140) may determine whether a fault signal has been detected on the system bus (130). Examples of fault signals include the failure of a PSU, the loss of a PSU input (i.e., a PIF), an under-voltage of a PSU internal output node, and the like.

If it is determined at ST 320 that a fault has occurred, then at ST 390, the PSUs are assigned to the normal system mode. For example, the system controller (140) may use the system bus (130) to set the IStar setting of each PSU to "not enabled," thereby indicating that the PSU is not in an IStar mode. After ST 390, the process terminates.

However, if it is determined at ST 320 that a fault has not occurred, then at ST 330, a determination is made about whether there is a need to update the configuration of the power supply system. For example, referring to FIG. 1A, the system controller (140) may determine whether an event requiring a reconfiguration of the power supply system (100) has been detected on the system bus (130). Examples of such events may include the addition of a PSU, the removal of a PSU, the addition of a PIF, the switching on/off of a PSU, and the like.

If it is determined at ST 330 that there is not a need to update the configuration of the power supply system, then the process returns to ST 310 to continue monitoring the status of the power supply system. However, if it is determined at ST 330 that there is a need to update the configuration of the power supply system, then at ST 340, a determination is made about whether the power supply system should operate in the IStar system mode. For example, referring to FIG. 1A, the system controller (140) may determine whether to use the IStar system mode based on the configuration of the power supply system (100).

If it is determined at ST 340 that the power supply system should not operate in the IStar system mode, then at ST 390, the PSUs are assigned to the normal system mode. After ST 390, the process terminates.

However, if it is determined at ST 340 that the power supply system should operate in the IStar system mode, then at ST 350, the PSUs are assigned to the IStar system mode. At ST 360, an order may be determined for the PSUs. At ST 370, each PSU may be assigned an ACTIVE ON threshold and an ACTIVE STANDBY OFF threshold. At ST 380, each PSU may optionally be assigned a mode. After ST 380, the process terminates. Optionally, after completing ST 380, the process of FIG. 3 may restart at ST 310. For example, after reconfiguring the power supply system (100), the system controller (140) may continue to monitor the power supply system (100) for further faults or events requiring system reconfiguration.

EXAMPLE 1

Figure 4:
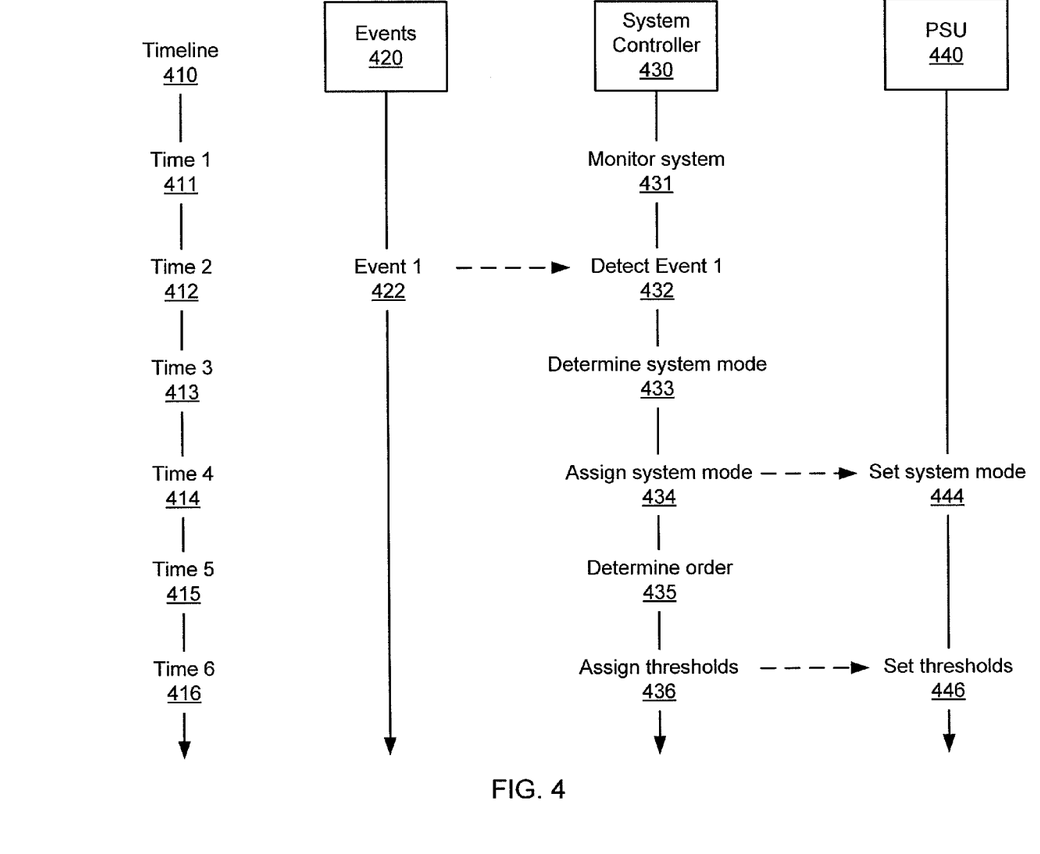
FIG. 4 shows an example of a power supply system, in accordance with one or more embodiments of the invention.

Consider the following example, as illustrated in FIG. 4, which describes the monitoring and reconfiguration of a power supply system, in accordance with one or more embodiments described above. The example shows actions performed by a system controller (430) (e.g., system controller (140) shown in FIG. 1A) and a PSU (440) (e.g., PSU (110A) shown in FIG. 1A) at various points on a timeline (410). Further, FIG. 4 shows system events (420) occurring within the power supply system (e.g., power supply system (100) shown in FIG. 1A). Note that, for the sake of clarity, only PSU (440) is shown in FIG. 4. However, a person of skill in the art will appreciate that the actions performed by the PSU (440), as shown in FIG. 4, may also be performed at other (or all) PSUs included in the power supply system.

At Time 1 (411), the status of the power supply system is monitored (431) by the system controller (430). For example, referring to FIG. 1A, the system controller (140) may use the system bus (130) to monitor for signals indicating a fault or other change to the power supply system.

At Time 2 (412), an Event 1 (422) occurs within the power supply system, and may be detected (432) by the system controller (430). For example, assume that a new PSU is added to the power supply system.

At Time 3 (413), a system mode is determined (433) by the system controller (430). For example, assume that the system controller (430) determines, based on a number of PSUs available, that the power supply system should operate in the IStar system mode.

At Time 4 (414), the system mode is assigned (434) by the system controller (430) to the PSU (440). The PSU (440) may then store (444) the system mode in an internal register (e.g., register(s) (172) shown in FIG. 1B). For example, referring to FIG. 1A, the system controller (140) may use the system bus (130) to assign the IStar system mode to PSU (110A) and PSU (110N).

At Time 5 (415), an order is determined (435) by the system controller (430). For example, referring to FIG. 1A, the system controller (140) may determine that PSU (110A) should be used (i.e., enter ACTIVE ON mode) before PSU (110N).

At Time 6 (416), thresholds are determined and assigned (436) by the system controller (430) to the PSU (440). For example, referring to FIG. 1A, the system controller (140) assigns respective ACTIVE ON and ACTIVE STANDBY OFF thresholds to PSU (110A) and PSU (110N). Further, the ACTIVE ON threshold of PSU (110A) may be set lower than the ACTIVE ON threshold of PSU (110N), such that PSU (110A) becomes active at a lower system load level than PSU (110N).

Figure 5:
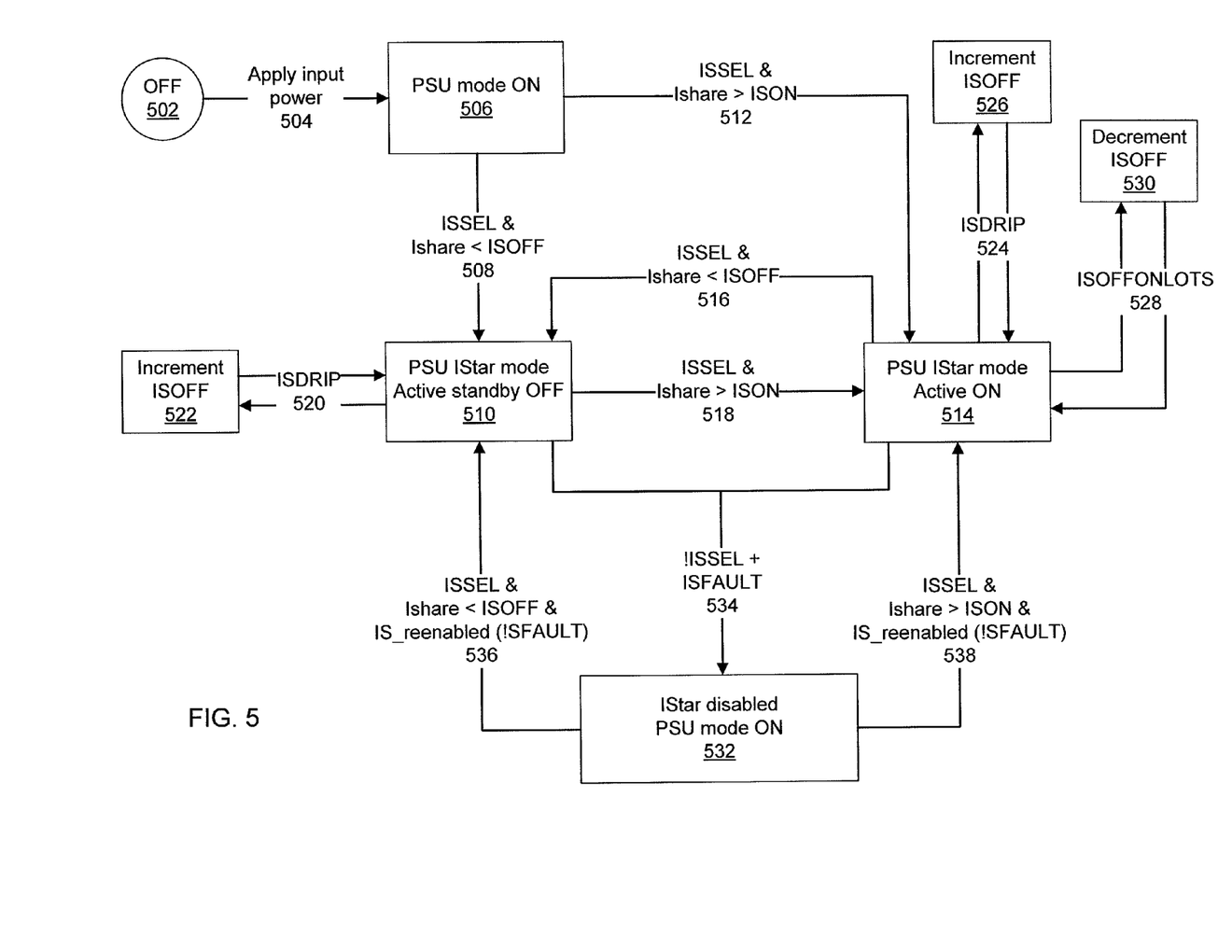
FIG. 5 shows a state diagram of a PSU under IStar control, in accordance with one or more embodiments of the invention.

FIG. 5 shows a state diagram of a PSU under autonomous control using IStar in accordance with one or more embodiments of the invention. A change in a state of the state diagram is driven by one or more signals. A signal may be an actual signal, a controlled signal, a voltage, an event, or any suitable combination thereof.

In state 502, the PSU is OFF. In other words, the mode of the PSU is OFF, and the PSU is not in an IStar mode. When input power is applied (i.e., apply input power (504)), the mode of the PSU changes from OFF (502) to PSU mode ON (506). The input power may be received by the PSU from one or more power input feeds to the PSU. Also, during the change in states of the PSU from OFF (502) to PSU mode ON (506), the PSU may receive IStar modes and thresholds from a controller of the power supply system.

When the state of the PSU is PSU mode ON (506), IStar operation is enabled in the PSU, designated by "ISSEL" in FIG. 5. Further, a controlled signal, common to all current share PSUs in the power supply system, is received by the PSU. The designation for the controlled signal is "Ishare" in FIG. 5. If Ishare is less than the threshold for ISOFF (i.e., the IStar ACTIVE STANDBY OFF threshold, designated as "ISOFF" in FIG. 5), and if ISSEL, then the state of the PSU changes from PSU mode ON (506) to PSU IStar mode ACTIVE STANDBY OFF (510). Alternatively, when the state of the PSU is PSU mode ON (506), and if Ishare is greater than the threshold for ISON (i.e., the IStar ACTIVE ON threshold, designated as "ISON" in FIG. 5), then the state of the PSU changes to PSU IStar mode ACTIVE ON (514). As a third alternative, when the PSU is in mode ON (506), and if Ishare is greater than the threshold for ISOFF and less than the threshold for ISON, then the state of the PSU remains unchanged at PSU mode ON (506).

When the state of the PSU is PSU IStar mode ACTIVE STANDBY OFF (510), a timer is set to determine whether the PSU remains in IStar mode ACTIVE STANDBY OFF (510) for a certain period of time without a change in state. If the PSU remains in IStar mode ACTIVE STANDBY OFF (510) for a certain period of time without a change in state, then the IStar drip indicator (designated by "ISDRIP" in FIG. 5) is triggered. When ISDRIP (520) is triggered, ISOFF is incremented (522). Once the Increment ISOFF (522) state has been performed, the state of the PSU reverts to PSU IStar mode ACTIVE STANDBY OFF (510), where ISDRIP (520) may again be triggered if another amount of time has elapsed.

When the state of the PSU is PSU IStar mode ACTIVE STANDBY OFF (510), the state of the PSU may also change to PSU IStar mode ACTIVE ON (514). For this change of state to occur, ISSEL must be true (i.e., IStar is active) and Ishare is greater than the threshold for ISON (518). Conversely, when the state of the PSU is PSU IStar mode ACTIVE ON (514), the state of the PSU may change to PSU IStar mode ACTIVE STANDBY OFF (510). For this change of state to occur, ISSEL must be true (i.e., IStar is active) and Ishare is less than the threshold for ISOFF (516).

Alternatively, when the state of the PSU is PSU IStar mode ACTIVE ON (514), a timer is set to determine whether the PSU remains in IStar mode ACTIVE ON (514) for a certain period of time without a change in state. If the PSU remains in IStar mode ACTIVE ON (514) for a certain period of time without a change in state, then ISDRIP (524) is triggered. When ISDRIP (52) is triggered, ISOFF is incremented (526). Once the Increment ISOFF (526) state has been performed, the state of the PSU reverts to PSU IStar mode ACTIVE ON (514), where ISDRIP (524) may again be triggered if another amount of time has elapsed.

As another alternative, when the state of the PSU is PSU IStar mode ACTIVE ON (514), a counter (designated as "ISOFFONLOTS" (528) in FIG. 5) looks back over a period of time to determine whether the number of times that the state of the PSU changes from PSU IStar mode ACTIVE STANDBY OFF (510) to PSU IStar mode ACTIVE ON (514) exceeds a threshold. If ISOFFONLOTS (528) is triggered, then Decrement ISOFF (530) becomes an enabled state. Decrement ISOFF (530) decreases the threshold for ISOFF by a certain amount. Once Decrement ISOFF (530) has been performed, the state of the PSU reverts to PSU IStar mode ACTIVE ON (514), where ISONOFFLOTS (528) may again be triggered if the number of times that the state of the PSU changes from PSU IStar mode ACTIVE STANDBY OFF (510) to PSU IStar mode ACTIVE ON (514) again exceeds the threshold in the time period.

As an example of how the ISOFFONLOTS mechanism functions, assume that the time period is configured as the last two hours, and that the counter ("ISOFFONLOTS" (528)) is configured to trigger after the fourth time that the IStar mode of ACTIVE ON is enabled in the time period. Further, assume that the threshold for the IStar mode of ACTIVE STANDBY OFF is 0.5V, and that the threshold for the IStar mode of ACTIVE ON is 0.55V. When the counter is triggered (i.e., within the past two hours, the IStar mode has gone, after starting in ACTIVE ON, from ACTIVE STANDBY OFF to ACTIVE ON four times), then the threshold for the IStar mode of ACTIVE STANDBY OFF is decremented. In this example, the threshold for the IStar mode of ACTIVE STANDBY OFF is decremented from 0.5V to 0.48V.

If a fault occurs in the power supply system, an IStar fault indicator (designated as "ISFAULT" in FIG. 5) is triggered. Further, when ISFAULT is triggered, IStar is disabled (designated as "!ISSEL" in FIG. 5). Whether the state of the PSU is PSU IStar mode ACTIVE STANDBY OFF (510) or PSU IStar mode ACTIVE ON (514), when !ISSEL+ISFAULT (534) (i.e., IStar is disabled and ISFAULT is triggered), then the state of the PSU changes to IStar disabled PSU mode ON (532).

To change states from IStar disabled PSU mode ON (532), the fault must be cleared (designated as "IS_reenabled (!ISFAULT)" in FIG. 5) and IStar must be reenabled (ISSEL). When IS_reenabled (!ISFAULT) and ISSEL, if Ishare is greater than the threshold for ISON, then the state of the PSU changes from IStar disabled PSU mode ON (532) to PSU IStar mode ACTIVE ON (514). Alternatively, when IS_reenabled (!ISFAULT) and ISSEL, if Ishare is less than the threshold for ISOFF, then the state of the PSU changes from IStar disabled PSU mode ON (532) to PSU IStar mode ACTIVE STANDBY OFF (510).

The following describes an example in accordance with one or more embodiments of the invention. The example is for explanatory purposes only and is not intended to limit the scope of the invention.

EXAMPLE 2

Figure 6:
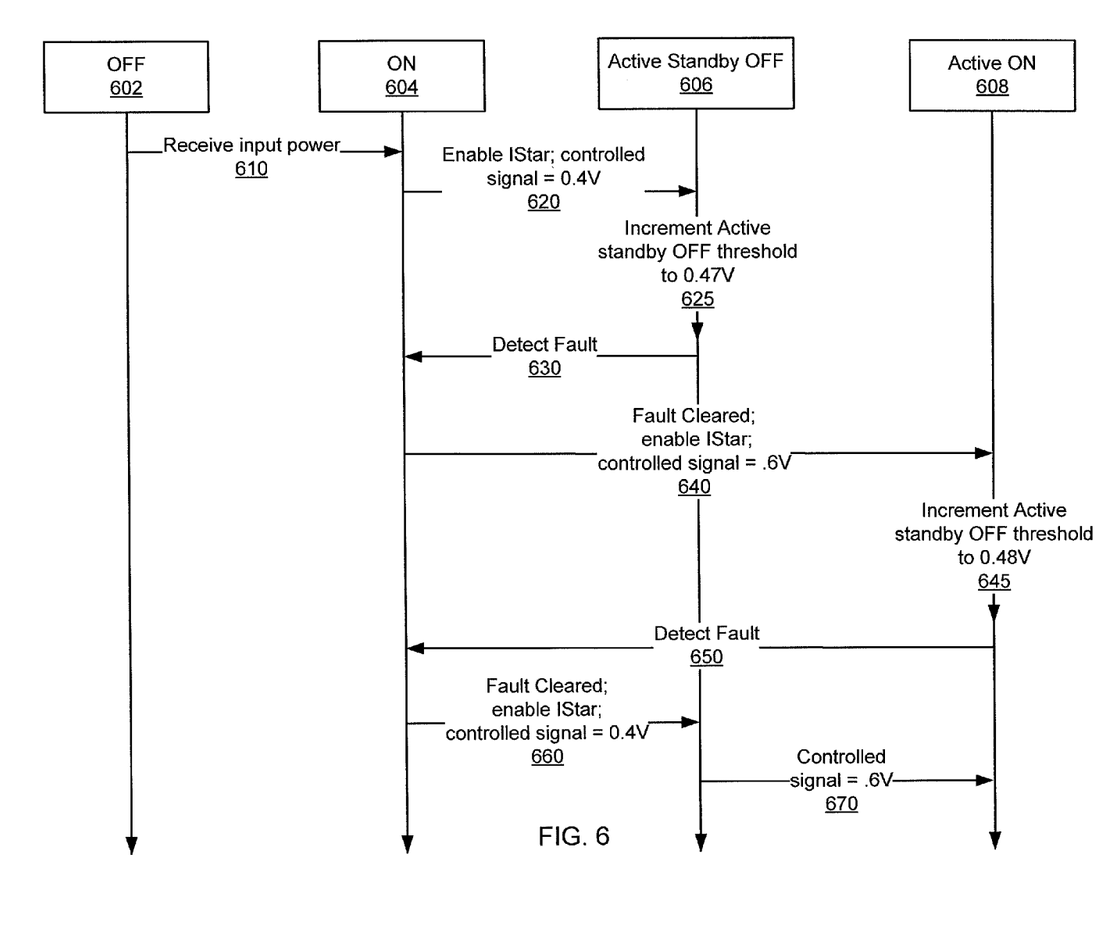
FIG. 6 shows an example of a sequence of events in a power supply system, in accordance with one or more embodiments of the invention.

Consider the following example, as illustrated in FIG. 6, which describes a sequence of events in a power supply system in accordance with one or more embodiments described above. The example shows modes (both IStar modes and non-IStar modes) over time based on different events. Specifically, FIG. 6 shows the non-IStar modes of OFF (602) and ON (604) and the IStar modes of ACTIVE STANDBY OFF (606) and ACTIVE ON (608). Each event in the series of time is accompanied by a description of the event as well as the modes and/or IStar modes involved.

The initial event (610) is "receive input power." The input power turns on the PSU, which changes the mode of the PSU from OFF (602) to ON (604). At this point in the Example, IStar is not enabled.

The subsequent event (620) is "Enable IStar; controlled signal=0.4V." As discussed above, before enabling IStar, the IStar modes and thresholds are received by each of the current share PSUs in the power supply system. IStar may be enabled by the controller, by the controlled signal, or by some other suitable device or signal. In this example, 0.4V is less than the threshold for the IStar mode of ACTIVE STANDBY OFF, and so the mode of the PSU changes from ON (604) to ACTIVE STANDBY OFF (606). In this example, the threshold for the IStar mode of ACTIVE STANDBY OFF is 0.46V.

The subsequent event (625) is "Increment ACTIVE STANDBY OFF threshold to 0.47V." This event corresponds to the PSU remaining in IStar mode ACTIVE STANDBY OFF for an amount of time in excess of a time counted of a drip timer (e.g., one hour). As explained above, when the IStar mode remains ACTIVE STANDBY OFF beyond the time counted by the drip timer, then the PSU autonomously increments the threshold for the IStar mode of ACTIVE STANDBY OFF. The threshold for ACTIVE STANDBY OFF is incremented in an effort to conserve more energy by the PSU by keeping the PSU in the IStar mode of ACTIVE STANDBY OFF for as long as possible (i.e., as long as the level of ISOFF is below the initial value set by the system).

The subsequent event (630) is "Detect Fault." In one or more embodiments of the invention, a fault is the loss of one or more PSUs in the power supply system. In this example, the detection of the fault changes the mode of the PSU from ACTIVE STANDBY OFF (606) to ON (604). In other words, detection of the fault causes the PSU to exit from IStar control.

The subsequent event (640) is "Fault cleared; enable IStar; controlled signal=0.6V." The problem that caused the fault in the previous event has been remedied. Also, IStar has been reenabled in the PSU. In this example, 0.6V is greater than the threshold for the IStar mode of ACTIVE ON, and so the mode of the PSU changes from ON (604) to ACTIVE ON (608).

The subsequent event (645) is "Increment ACTIVE STANDBY OFF threshold to 0.48V." This event corresponds to the PSU remaining in IStar mode ACTIVE ON for an amount of time in excess of a time counted by a drip timer (e.g., 30 minutes). The drip timer used in this event (645) may be a different drip timer than the drip timer used in previous event (625). As explained above, when the IStar mode remains ACTIVE ON beyond the time counted by the drip timer, then the PSU autonomously increments the threshold for the IStar mode of ACTIVE STANDBY OFF. The threshold for ACTIVE STANDBY OFF is incremented in an effort to conserve more energy by the PSU by keeping the PSU in the IStar mode of ACTIVE STANDBY OFF for as long as possible.

The subsequent event (650) is "Detect Fault." As in the previous "Detect Fault" event (630), one or more PSUs in the power supply system has been lost. In this example, the detection of the fault changes the mode of the PSU from ACTIVE ON (608) to ON (604). In other words, detection of the fault causes the PSU to exit from IStar control.

The subsequent event (660) is "Fault cleared; enable IStar; controlled signal=0.4V." The problem that caused the fault in the previous event has been remedied. Also, IStar has been reenabled in the PSU. As was previously the case in this example, 0.4V is less than the threshold for the IStar mode of ACTIVE STANDBY OFF, and so the mode of the PSU changes from ON (604) to ACTIVE STANDBY OFF (606). In this example, the IStar modes and thresholds remain unchanged, so the threshold for the IStar mode of ACTIVE STANDBY OFF remains at 0.48V.

The final event (670) is "Controlled signal=0.6V." IStar remains active for this event, and the controlled signal has increased by 0.2V. As was previously the case in this example, 0.6V is greater than the threshold for the IStar mode of ACTIVE ON, and so the mode of the PSU changes from ACTIVE STANDBY OFF (606) to ACTIVE ON (608). In this example, the threshold for the IStar mode of ACTIVE ON is 0.58V.

One or more embodiments of the invention provide a system and method for controlling a system of PSUs in an energy efficient manner. The aforementioned benefits of using embodiments of the invention are particularly realized when a PSU operates at relatively low power levels (less than 25%, or when a PSU is typically in "idle" or "standby" mode) relative to full power capability for the PSU. When a current share PSU is under IStar control, the standby mode is ACTIVE STANDBY OFF, which requires less power because unnecessary functions are quiesced. Specifically, by using one or more embodiments of the invention, more than 50% energy savings may be realized relative to current methods of PSU operation when a PSU is in standby mode or a mode where less than 25% of the system capacity of the PSU is being used. Embodiments of the invention applied to a power supply system that includes eight PSUs use approximately three thousand kilowatt-hours less power per year than when the same power supply system operates using current control technologies. If a consumer pays $0.10 per kilowatt-hour, then the consumer may realize $300 in annual savings by using the IStar control with the power supply system.

Software instructions adapted to perform embodiments of the invention, when executed by a processor(s), may be stored on memory or any non-transitory computer readable storage medium such as a compact disc (CD), a digital video disk (DVD), a diskette, a tape, a memory stick, a flash memory drive, a register, and the like.

While the invention has been described with respect to a limited number of embodiments, those skilled in the art, having benefit of this disclosure, will appreciate that other embodiments may be devised which do not depart from the scope of the invention as disclosed herein. Accordingly, the scope of the invention should be limited only by the attached claims.

What is claimed is:

1. A non-transitory computer readable storage medium having computer readable program code embodied therein, the computer readable program code adapted to, when executed by a processor, implement a method for managing a power supply system, the method comprising:
    identifying a first plurality of power supplies included in the power supply system;
    determining a first system mode for the power supply system;
    determining a first operating order for the first plurality of power supplies;
    assigning, based on the first operating order, a first ACTIVE ON threshold to each of the first plurality of power supplies to obtain a plurality of first ACTIVE ON thresholds; and
    assigning, based on the first operating order, a first ACTIVE STANDBY OFF threshold to each of the first plurality of power supplies to obtain a plurality of first ACTIVE STANDBY OFF thresholds, wherein when each of the plurality ACTIVE STANDBY OFF thresholds are reached, the corresponding power supply of the first plurality of power supplies switches to ACTIVE STANDBY OFF MODE in which output bulk capacitors of the corresponding power supply are charged and a switching regulator of the corresponding power supply is not enabled;
    wherein the power supply system provides electrical power to at least one computer system.

2. The non-transitory computer readable storage medium of claim 1, the method further comprising:
    monitoring the power supply system; and
    upon receiving an indication of a requirement to reconfigure the power supply system:
        identifying a second plurality of power supplies included in the power supply system;
        determining a second system mode for the power supply system;
        determining a second operating order for the second plurality of power supplies;
        assigning, based on the second operating order, a second ACTIVE ON threshold to each of the second plurality of power supplies to obtain a plurality of second ACTIVE ON thresholds; and
        assigning, based on the second operating order, a second ACTIVE STANDBY OFF threshold to each of the second plurality of power supplies to obtain a plurality of second ACTIVE STANDBY OFF thresholds.

3. The non-transitory computer readable storage medium of claim 2, wherein the indication of a requirement to reconfigure the power supply system comprises a failure of at least one of the first plurality of power supplies.

4. The non-transitory computer readable storage medium of claim 2, wherein the indication of a requirement to reconfigure the power supply system comprises a removal of at least one of the first plurality of power supplies from the power supply system.

5. The non-transitory computer readable storage medium of claim 2, wherein the indication of a requirement to reconfigure the power supply system comprises an addition of a new power supply to the power supply system.

6. The non-transitory computer readable storage medium of claim 2, wherein the indication of a requirement to reconfigure the power supply system comprises a failure of at least one power input feed to the power supply system.

7. A power supply system, comprising:
    a plurality of power supplies; and
    a system controller, configured to:
        determine a system mode for the power supply system;
        determine an operating order for the plurality of power supplies;
        assign, based on the operating order, the system mode to each of the plurality of power supplies;
        assign, based on the operating order, an ACTIVE ON threshold to each of the plurality of power supplies to obtain a plurality of ACTIVE ON thresholds; and
        assign an ACTIVE STANDBY OFF threshold to each of the plurality of power supplies to obtain a plurality of ACTIVE STANDBY OFF thresholds, wherein when each of the plurality ACTIVE STANDBY OFF thresholds are reached, the corresponding power supply of the plurality of power supplies switches to ACTIVE STANDBY OFF MODE in which output bulk capacitors of the corresponding power supply are charged and a switching regulator of the corresponding power supply is not enabled,
    wherein the power supply system provides electrical power to a computer system,
    wherein each of the plurality of ACTIVE ON thresholds is distinct, and
    wherein each of the plurality of ACTIVE STANDBY OFF thresholds is distinct.

8. The power supply system of claim 7, further comprising a system bus connecting the system controller and the plurality of power supplies.

9. The power supply system of claim 8, wherein the system controller is further configured to monitor each of the plurality of power supplies using the system bus.

10. The power supply system of claim 8, wherein assigning the ACTIVE ON threshold and the ACTIVE STANDBY threshold to each of the plurality of power supplies is performed using the system bus.

11. The power supply system of claim 8, wherein each one of the plurality of power supplies uses the system bus to transmit a current share signal indicating an output load of the plurality of power supplies.

12. The power supply system of claim 11, wherein each of the plurality of power supplies compares the current share signal to the ACTIVE ON and ACTIVE STANDBY OFF thresholds.

13. The power supply system of claim 7, wherein each of the plurality of power supplies comprises registers configured to store the ACTIVE ON threshold and the ACTIVE STANDBY OFF threshold.

14. The power supply system of claim 7, wherein each of the plurality of power supplies comprises a register storing a description of the system mode.

15. The power supply system of claim 7, wherein the system controller is a driver included in an operating system of the computer system.

16. The power supply system of claim 7, wherein the system controller is controlled by an operating system of the computer system.

17. A system controller for a power supply system, comprising:
a processor; and
a computer readable medium comprising computer readable program code embodied therein, which when executed by the processor, perform a method, the method comprising:
identifying a plurality of power supplies included in the power supply system;
determining a first system mode for the power supply system;
determining a first operating order for the plurality of power supplies;
assigning, based on the first operating order, a first ACTIVE ON threshold to each of the plurality of power supplies to obtain a plurality of first ACTIVE ON thresholds; and
assigning, based on the first operating order, a first ACTIVE STANDBY OFF threshold to each of the plurality of power supplies to obtain a plurality of first ACTIVE STANDBY OFF thresholds, wherein when each of the plurality of first ACTIVE STANDBY OFF thresholds are reached, the corresponding power supply of the plurality of power supplies switches to ACTIVE STANDBY OFF MODE in which output bulk capacitors of the corresponding power supply are charged and a switching regulator of the corresponding power supply is not enabled.

18. The system controller of claim 17, wherein the method further comprises:
monitoring the power supply system; and
upon receiving an indication of a requirement to reconfigure the power supply system:
determining a second system mode for the power supply system;
determining a second operating order for the plurality of power supplies;
assigning, based on the second operating order, a second ACTIVE ON threshold to each of the plurality of power supplies to obtain a plurality of second ACTIVE ON thresholds; and
assigning, based on the second operating order, a second ACTIVE STANDBY OFF threshold to each of the plurality of power supplies to obtain a plurality of second ACTIVE STANDBY OFF thresholds.

19. The system controller of claim 18, wherein the indication of a requirement to reconfigure the power supply system comprises a completion of a predefined time period.

20. The system controller of claim 19, wherein the predefined time period is specified to balance a lifetime loading of the plurality of power supplies.

* * * * *

UNITED STATES PATENT AND TRADEMARK OFFICE
CERTIFICATE OF CORRECTION

PATENT NO. : 8,595,534 B2
APPLICATION NO. : 12/886843
DATED : November 26, 2013
INVENTOR(S) : Doblar et al.

Page 1 of 1

It is certified that error appears in the above-identified patent and that said Letters Patent is hereby corrected as shown below:

In the Specification:

In column 5, line 5, delete "that that" and insert -- that --, therefor.

In column 7, line 67, delete "IS_STEPUP SIZE." and insert -- IS_STEPUP_SIZE. --, therefor.

In column 8, line 1, delete "IS_FAULT FORCE" and insert -- IS_FAULT_FORCE --, therefor.

In column 8, line 2, delete "IS_FAULT ENABLE" and insert -- IS_FAULT_ENABLE --, therefor.

In column 8, line 3, delete "IS_FAULT ON TIME" and insert -- IS_FAULT_ON_TIME --, therefor.

In column 8, line 35, delete "that that" and insert -- that --, therefor.

In column 9, line 24, delete "system" and insert -- system. --, therefor.

In the Claims:

In column 17, line 2, In Claim 10, delete "ACTIVE STANDBY" and insert -- ACTIVE STANDBY OFF --, therefor.

Signed and Sealed this
Tenth Day of June, 2014

Michelle K. Lee
*Deputy Director of the United States Patent and Trademark Office*